May 10, 1955 J. J. DONOVAN 2,708,142
LIFT DISENGAGER
Filed Feb. 14, 1951
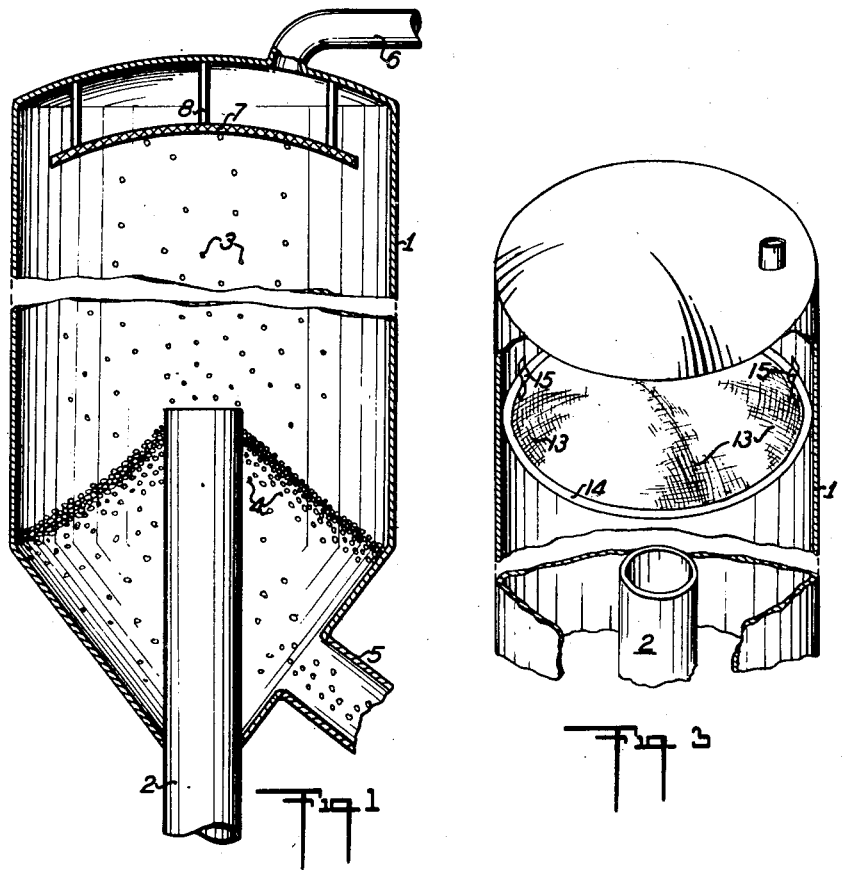
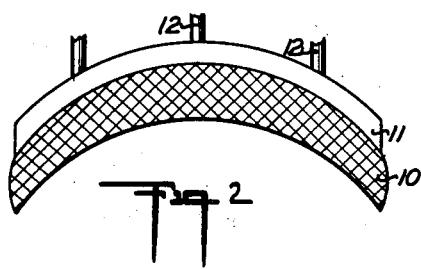
INVENTOR
Joseph J. Donovan
BY
ATTORNEY

United States Patent Office 2,708,142
Patented May 10, 1955

2,708,142
LIFT DISENGAGER

Joseph J. Donovan, Swarthmore, Pa., assignor to Houdry Process Corporation, Wilmington, Del., a corporation of Delaware Application February 14, 1951, Serial No. 210,844

2 Claims. (Cl. 302—59)

This invention relates to a method of reducing the attrition of catalyst employed in a hydrocarbon cracking process and, more particularly, to a means for cushioning the catalyst on discharge from a gas elevator.

In systems for cracking hydrocarbons wherein the hydrocarbons are contacted with a catalyst, there has been developed what is known as a moving catalyst process. This process comprises initially contacting the hydrocarbons with the catalyst followed by conveying the catalyst away from the reaction zone and into a regeneration zone wherein coke formed on the catalyst during the reaction step is removed, the catalyst then being reconveyed to the reaction zone for further contact with the hydrocarbons to be cracked. Various particle sizes of catalyst are employed in catalytic cracking processes ranging from finely divided or powdered catalyst upward. The solid materials with which this invention is concerned are those having an average particle size of 14 mesh or larger and including coarse granules as well as the typical commercial beads and whole pellets of about 2 to 5 mm. diameter.

Older methods for moving the catalyst from the reaction zone to the regenerating zone and then back to the reaction zone employed mechanical means such as bucket elevators. More recently, the catalyst has been elevated from a lower region to an upper region of the system by means of a gas elevator. Elevators of this latter type comprise a hopper, an elongated lift pipe, and a disengaging chamber at the top thereof. In operation, the catalyst particles are permitted to flow to the hopper, generally by gravity, from a regeneration zone, forming a confined bed therein. The lift pipe extends downwardly into the hopper and beneath the level of the confined bed. A suitable gas stream is introduced into the bed within the hopper and issues therefrom upwardly through the lift pipe whereby the catalyst particles are impelled by and carried along with the gas stream. After travelling upwardly through the lift pipe the gas and particles are discharged into a disengaging chamber, the catalyst particles falling by gravity to the bottom of the chamber and the gas being withdrawn from the top of the chamber.

During commercial operation of cracking processes employing a gas elevator, attrition of the catalyst may develop, resulting in the formation of fines and loss of catalyst through removal from the system of these fines. A major cause of the attrition of the catalyst has been found to be a result of the particles issuing from the gas elevator at a relatively high velocity and impinging upon the walls and particularly the top of the disengaging chamber. In the designing of equipment for use in the gas elevator system, the disengaging chamber is usually of a sufficient size to prevent the majority of particles of catalyst issuing from the elevator tube from impinging on the walls and top with a degree of force sufficient to cause appreciable attrition. However, due to varying particle size and a distribution of velocity, some of the catalyst particles have more than the average design velocity, whereupon they strike the metallic walls or top of the chamber (primarily the top as it is directly opposite the elevator tube outlet) with sufficient force to result in their breaking down eventually to fine powder. In view of the fact that processes of the aforementioned type continually recycle the catalyst in such manner that it passes through the gas elevator system many times, it will be readily appreciated that even one percent of the particles striking the metallic surface of the disengaging chamber at high velocities could lead to rates of attrition uneconomically high because of the necessity to replace the fines, thus produced, with new catalyst.

One method of preventing catalyst particles from impinging on the top of the disengaging chamber and thereby disintegrating would be to increase the overall height of the disengaging chamber so as to provide sufficient space therein for allowing the particles to lose their momentum. However, it can be appreciated that such an increase would involve added cost for the additional materials of construction. Further, in the systems presently employed the disengaging chamber may be necessarily several hundred feet above the ground in order to elevate the catalyst to such a height as to permit gravitational flow to and through the reactor and regenerator units. Thus, extending the overall size of the disengaging chamber would involve further added expense as reflected through the additional supporting structure required.

Accordingly, it is the primary object of this invention to provide a means for preventing particles, issuing from a gas elevator, having more than the average design velocity from striking the walls (primarily the top) of a gas and particle disengaging chamber.

Another object is the provision in a system of the class described of a baffle which is so disposed in the path of the issuing particles as to absorb their energy. A further object of the invention is the attainment of the immediate foregoing with a resilient and comparatively inexpensive mat which will minimize or prevent attrition of the particles.

With the above and other objects in view, the invention has particular relation to certain novel features of arrangement of apparatus and use, examples of which are given in the following specification and illustrated in the accompanying drawing in which like reference numerals designate like parts.

In said drawing:

Figure 1 is a fragmentary elevation, partly in section, in which there is illustrated a disengaging chamber employing the apparatus of the present invention, the latter being diagrammatically represented;

Figure 2 is an enlarged diagrammatic elevational view of the energy absorbing apparatus of Figure 1; and Figure 3 is a fragmentary isometric view, partly in section, of a modification.

Referring more particularly to the drawing, the numeral 1 designates the housing of a disengaging chamber of the type referred to hereinbefore, this disengaging chamber being provided with a gas elevator tube or shaft whose discharge end is shown at 2. Pellets or particles of catalyst issuing from the elevator tube are shown at 3, while those pellets or particles which have been separated from the gas are shown at 4. An extension 5 of the housing 1 leads to a regenerator or reactor through which the granular pellets are conveyed by gravity. An outlet for the gas which has been separated from the particles or pellets is indicated at 6.

The energy absorbing means of the present invention is shown diagrammatically at 7, being held in position by suitable supports 8. In its preferred embodiment, the baffle 7 of the present invention has a curvilinear form, although it could, of course, take any one of a variety of forms depending on the design of chamber 1 and the size of the discharge outlet of tube 2, as well as the fluid velocities employed.

In Figure 2, the numeral 10 represents a resilient mat which is provided with a suitable backing or support 11. A means for attaching the backing 11 to the chamber is generally indicated at 12.

In Figure 3 of the drawing, a modified form of the present invention is shown as comprising a metallic gauze 13 for absorbing the energy of the pellets or particles, said gauze being suitably supported in the chamber 1, as by means of a ring 14 and bracket 15.

In operation: The particles of catalyst are introduced into a gas stream in the lower portion of the tube 2, and are conveyed upwardly therethrough until they are discharged into the chamber 1, wherein they are separated from the gas, the said particles falling into the lower portion of the chamber 1 and the gas being withdrawn through the outlet 6.

The majority of the particles will ordinarily have only sufficient velocity to travel a relatively short distance in the chamber 1 beyond the discharge end 2 of the gas elevator tube; and, without the necessary velocity to continue onwardly, they will fall without striking the baffle 7. However, those particles having more than average velocity will travel upwardly until they strike the baffle 7. Baffle 7, in accordance with the teaching of the present invention, is composed of a resilient or springy material in order to absorb the energy of the impinging particles and thus allow the particles to fall by gravity to the bottom of the disengaging chamber.

The baffle 7 may take one of several forms, such as a resilient mat of sufficient thickness to insure absorption of particle energy, or metallic gauze suitably supported to insure sufficient resiliency. Included in the specific materials which may be used are mats of glass and/or mineral wool. The materials used as the baffle of the instant invention must have a relatively high degree of springiness accompanied by low mass in order that it may be deformed by impact of a particle, absorb impact energy, and return to its original shape in time to react upon another arriving particle. Further, the material comprising the baffle should be temperature resistant inasmuch as conditions of operation will probably involve temperatures above 800° F.

Another embodiment contemplates a mat or layer of springs, rods or the like, the elements of which are so constructed and arranged that they have the desired resiliency and energy absorbing characteristics.

In one of several tests, the operativeness of the present invention was demonstrated by forming a crimped metallic mesh into multilayered pads and used under conditions wherein catalyst struck or impinged on the pad at an appoximate velocity of 39 feet per second. In this test, it was observed that the breakage loss was markedly reduced over that resulting from similar contact on a steel plate and that the pad is fully capable of withstanding the impact of the catalyst particles.

The thickness of the pads or mats employed should be such that they are not totally compacted by the steady stream of particulate matter and so supported that the effect of the supports on the resiliency of the mat or pad is not such as to greatly reduce its effective resiliency.

In view of the possibility that minute catalyst material will remain in the mat, gas may be passed from the back of the mat to the front in order to blow away particles which might be trapped therein.

While I have shown and described certain specific embodiments of the present invention, it will be readily understood by those skilled in the art that I do not wish to be limited exactly thereto, since various modifications may be made without departing from the scope of the invention as defined in the appended claims.

I claim:

1. In an apparatus for lifting granular particles of about 2 to 5 mm. size from a lower level to a higher level and comprising a vertical gas elevator tube and a gas and particle disengaging chamber at the top of said elevator tube, said disengaging chamber being of sufficient size to prevent the major portion of granular particles introduced therein to impinge on the walls and top of said chamber, the improvement comprising means positioned within the upper portion of said chamber and above said elevator tube in the path of the minor portion of said particles delivered by said elevator tube at more than average design velocity, said means being composed of resiliently compactible material having a relatively high degree of springiness accompanied by low mass and adapted for absorbing the energy of said minor portion of particles.

2. Apparatus according to claim 1 wherein said resiliently compactible material is a mat formed of at least one member of the group consisting of metallic mesh, metallic gauze, mineral wool and glass wool, and having a curvilinear lower surface.

References Cited in the file of this patent

UNITED STATES PATENTS

| | | |
|---|---|---|
| 412,388 | Hungerford | Oct. 8, 1889 |
| 444,884 | Howell | Jan. 20, 1891 |
| 641,045 | Schuman | Jan. 9, 1900 |
| 824,585 | Rieth | June 26, 1906 |
| 1,044,181 | Hudson | Nov. 12, 1912 |
| 1,080,399 | Young | Dec. 2, 1913 |
| 1,114,318 | Vasey | Oct. 20, 1914 |
| 2,429,751 | Gohr | Oct. 28, 1947 |
| 2,493,911 | Brandt | Jan. 10, 1950 |
| 2,541,077 | Leffer | Feb. 13, 1951 |

FOREIGN PATENTS

| | | |
|---|---|---|
| 455,139 | Germany | June 2, 1927 |